United States Patent [19]
Zelders

[11] 3,973,536
[45] Aug. 10, 1976

[54] DEVICE FOR FEEDING FUEL TO A DIESEL ENGINE

[75] Inventor: Wim Zelders, Nuenen, Netherlands

[73] Assignee: Van Doorne's Bedrijfswagenfabriek Daf B.V., Eindhoven, Netherlands

[22] Filed: May 28, 1974

[21] Appl. No.: 474,146

[30] Foreign Application Priority Data
Feb. 5, 1974  Netherlands ...................... 7401553

[52] U.S. Cl. ................................ 123/136; 73/113; 123/41.31; 123/139 AT; 123/198 R
[51] Int. Cl.² ...................................... F02M 59/00
[58] Field of Search ...... 123/136, 139 AA, 139 AT, 123/139 R, 41.31, 198 R; 73/233, 113; 165/51

[56] References Cited
UNITED STATES PATENTS

| | | | |
|---|---|---|---|
| 2,327,419 | 8/1943 | Grandy | 73/113 |
| 3,006,144 | 10/1961 | Arnett | 73/113 |
| 3,831,439 | 8/1974 | Konomi | 73/113 |

*Primary Examiner*—Charles J. Myhre
*Assistant Examiner*—Daniel J. O'Connor
*Attorney, Agent, or Firm*—Wenderoth, Lind & Ponack

[57] ABSTRACT

A device for feeding fuel to a diesel engine including a fuel storage tank, a feed pump provided in a conduit between the fuel storage tank and the engine, and an injection pump for atomization. The injection pump is provided with a pressure control valve for reducing the excessive pressure to that of the pressure prevailing in the conduits and with a device for measuring the fuel consumption. Means are provided for substantially equalizing the temperature of the fuel in a return conduit and in the feed conduit, and for holding the fuel under excessive pressure in the feed conduit.

4 Claims, 4 Drawing Figures

3,973,536

DEVICE FOR FEEDING FUEL TO A DIESEL ENGINE

BACKGROUND OF THE INVENTION

The present invention relates to a device for feeding fuel to a diesel engine, the device including a fuel storage tank, a pump provided in the conduit between the fuel storage tank and the engine and an injection pump for the atomizer(s), which latter pump is provided with a pressure control valve for reducing the excessive pressure to the pressure prevailing in the conduits and a device for measuring the consumption of fuel.

It is often important that the fuel consumption of vehicles and vessels be measured in an accurate way. The reasons therefore are the following:

1. Vehicles and vessels exist which include an auxiliary means, in addition to the engine, for propulsion, such auxiliary means being driven by the same engine. Sometimes it is desirable to know the fuel consumption of each of the engines, e.g. because restitution of excise on fuel can be reclaimed or because one wishes to obtain an exact knowledge of the actual operation expenses.

2. Checks must be made to determine whether the fuel consumption of the engine is normal or whether there are any deficiencies which cause an excessive fuel consumption.

3. Mutual comparison of vehicles must be made for economic considerations.

4. Supervision of quantities of fuel purchased and of quantities of fuel used must be possible.

5. It is desirable to achieve optimal improvement of the type of driving with respect to economic use.

The measurements of the items 1–3 could be carried out by means of a temporary device including a guage on the vehicle. However, measurements according to items 4 and 5 require a more permanent construction of the measuring instrument.

It is usual to measure fuel consumption by one single flow meter.

If, however, only a flow meter is mounted into a fuel conduit system, two disadvantages are created:

a. Loss of power, which, possibly, could be compensated by increased fuel consumption.

b. Inaccuracy of measuring.

These disadvantages arise as follows:

a. A diesel engine always has a return conduit, by means of which the fuel being fed to the fuel pump and not being injected by the atomizers is returned to the fuel storage tank. If a gauge is placed in the fuel conduit system, care must be taken that no fuel is returned to the tank by means of the return conduit. The return conduit then must be linked up with the feeding conduit behind or downstream of the gauge. However, the temperature of the fuel returned is considerably higher than the temperature of the fuel in the storage tank. Such returned fuel would normally be cooled in the storage tank. When heated fuel is injected into the engine, the power thereof decreases since the injection is volumetrically constant, however due to the increased temperature the density of the fuel is less. Moreover, there are gas bubbles in returned fuel having an increased temperature, by which the effect of the loss of power of the engine is enhanced.

b. The feed pump creates a strongly varying flow rate (pulsing flow) in the fuel conduit system, involving over and under pressure conditions in the conduits. Also, the fuel pump must provide power for the operation of the gauge. An under pressure condition causes the formation of gas bubbles and therefore an inaccuracy of measurement, caused by the irregularity of the rate of feed of the injection pump.

SUMMARY OF THE INVENTION

It is the object of the present invention to overcome the above disadvantages by the provision of means for substantially equalizing the temperature of the fuel in the return conduit and in the feed conduit, and by the provision of means for keeping the fuel under excessive pressure in order to avoid the formation of gas bubbles.

BRIEF DESCRIPTION OF THE DRAWINGS

The device according to the present invention is shown in the attached drawings by way of example, wherein.

DETAILED DESCRIPTION OF THE INVENTION

In all figures parts are shown which can be used in the known systems and in systems according to the present invention as well.

A fuel storage tank is indicated with 1, a vent with 2, a sieve 3 in tank 1, 4 is a water trap, 5 is a feed pump, 6 is an injection pump, 7 is a fine filter, 8 is a venting conduit, 9 is a pressure control valve, 10 is a return conduit, 11 is an atomizer, of which a plurality may be provided, 12 is a leak oil conduit, and 13 is a check valve. All of these elements are common to known systems as well as systems according to the invention.

Figure 1:
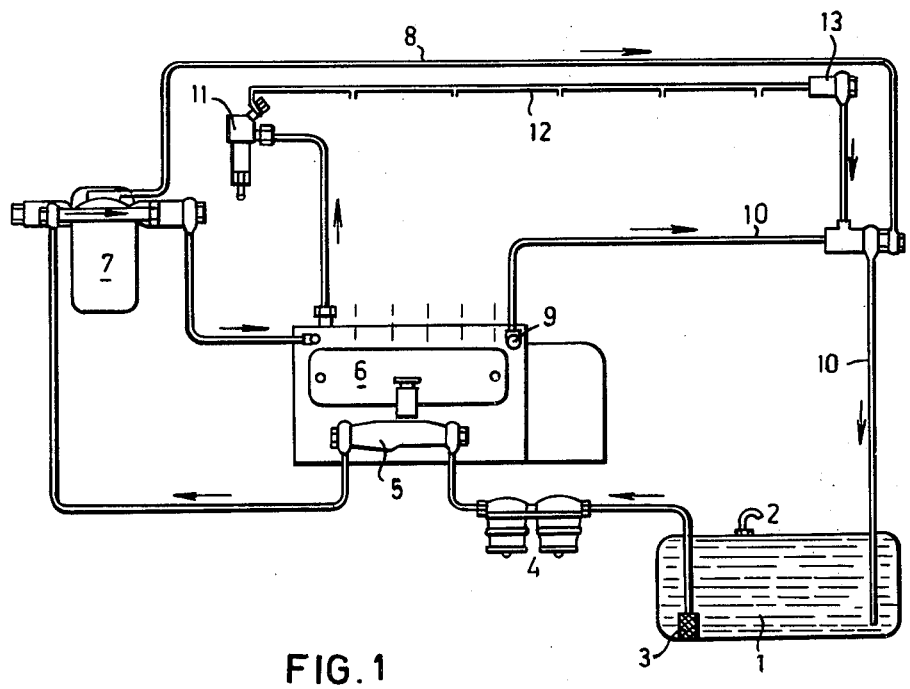
FIG. 1 shows a fuel system for diesel engines without a gauge or measuring instrument.
Figure 2:
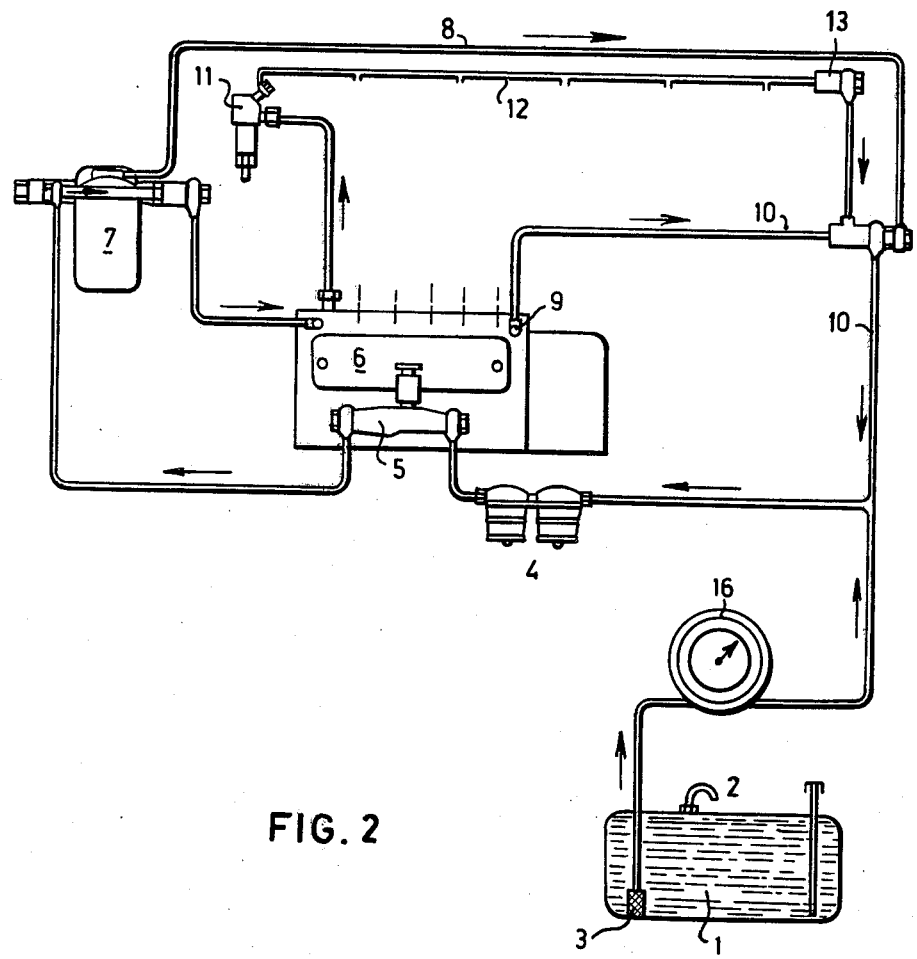
FIG. 2 shows a fuel system in which a gauge or measuring instrument is provided in the usual way.
Figure 3:
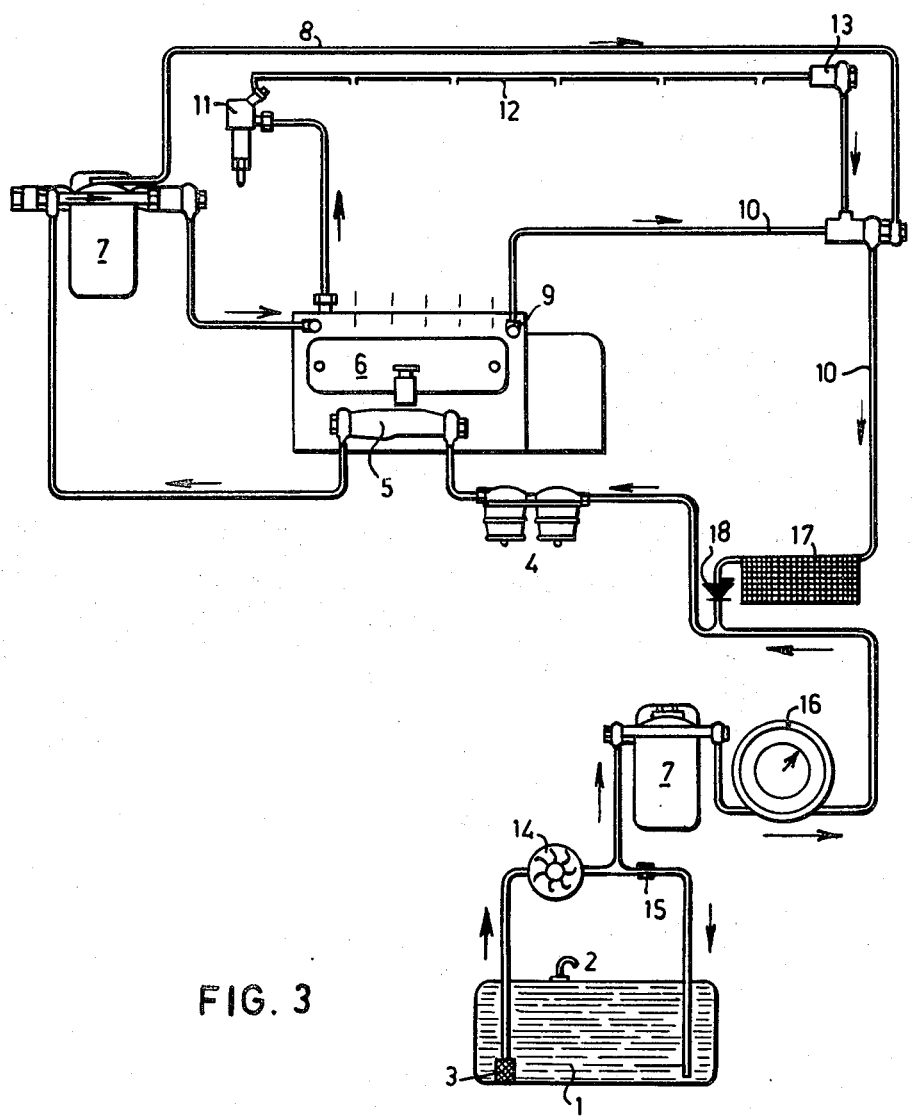
FIG. 3 shows a first embodiment for the arrangement of a gauge or measuring instrument according to the present invention.

In the embodiment of the invention shown in FIG. 3, a cooling means 17 causes the returned fuel in the conduit 10 to have the same temperature as the fuel in the feed conduit to the pump 5. The cooling means 17 may alternately be a heat exchanger arranged to extend through the fuel storage tank 1, as shown in FIG. 4.

By means of an additional pump 14 drawing the fuel from the tank 1, by means of excess flow valve 18 behind or downstream of the cooling means 17, and by means of the waist or restriction 15 in the return conduit, an over pressure condition is caused in the feed conduit and the return conduit 10. The formation of gas bubbles in these conduits is thereby prevented. The pump 14 also takes over the function of drawing fuel from the supply pump 5. Therefore, the creation of a pulsating flow of fuel is avoided. Such pulsating flow would have an adverse influence on the operation of flow gauge 16 positioned in the feed conduit. The pump 14 also provides power for the operation of the gauge 16 which is a measuring instrument for measuring flow of fuel.

The excess flow valve 18 also maintains the over pressure condition in the return conduit 10. It is known to apply a pressure control valve 9 to the injection pump 6 by means of which the pressure (± 1.5 ato over pressure) of the injection pump is reduced to the pressure prevailing in the conduit system. According to the invention, the over pressure is reduced by valve 18 to the prevailing pressure in two steps, namely in the first place between the valve 9 and the valve 18 from 1.5 ato to 0.5 ato, and secondly, downstream of the valve 18 to the prevailing pressure (± 0.3 ato).

Figure 4:
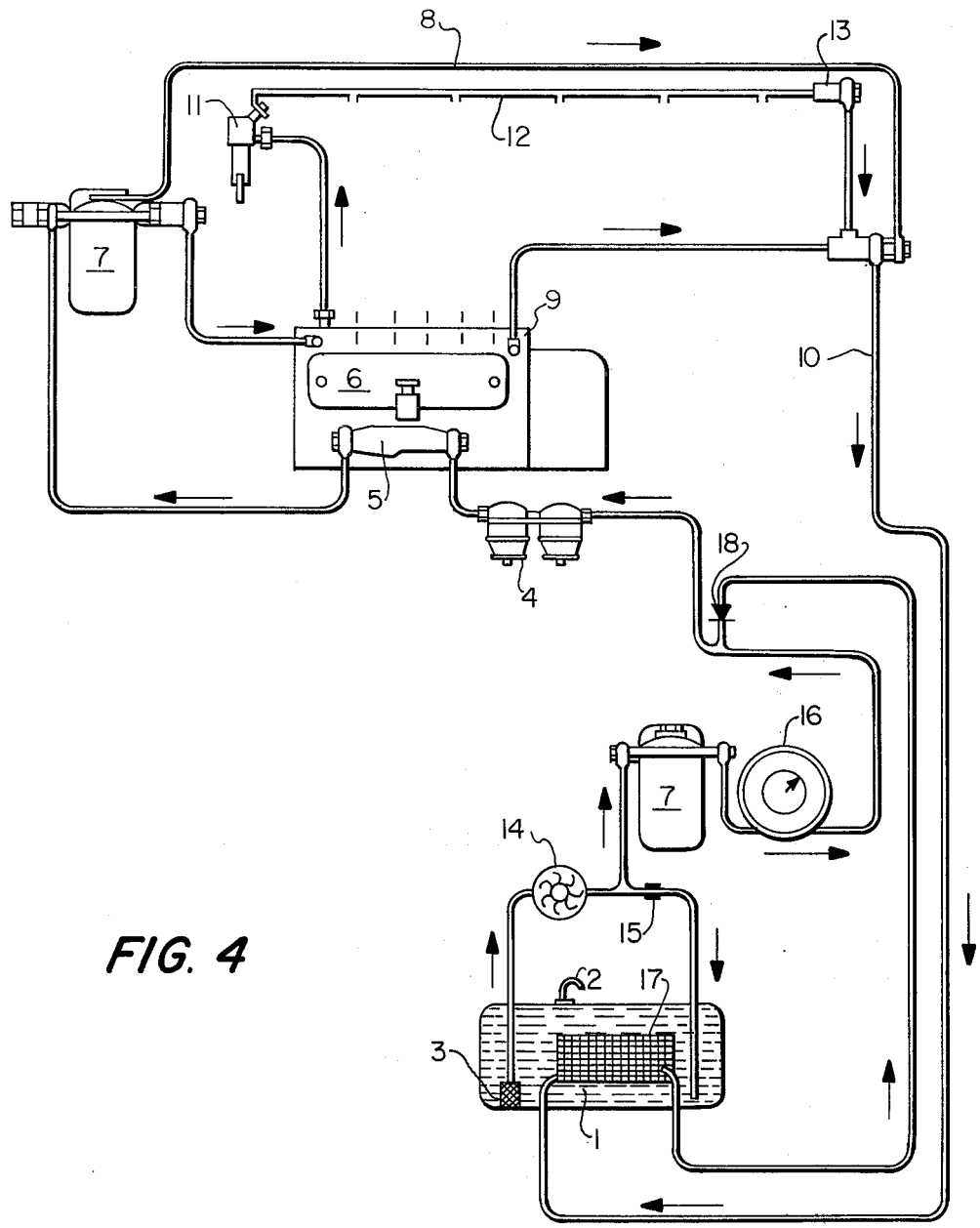
FIG. 4 shows a second embodiment for the arrangement of a gauge or measuring instrument according to the present invention.

The embodiment of FIG. 4, in which the over pressure condition in the fuel conduit system is accomplished by providing an over pressure condition in the fuel storage tank, which is provided for that purpose with a check valve at 2, also lies within the scope of the present invention.

The problems which occur in the accurate measurement of the fuel consumption of diesel engines cannot be solved by the application of two flow meters. If a flow meter is placed in the feed conduit and a second flow meter in the return conduit, then the difference of the fuel quantities measured does not provide an accurate value of the fuel consumption. In the first place the inaccuracy of measurement of the gauge is doubled, and in the second place the disadvantage remains that fuel having an increased temperature is measured by the gauge or measuring instrument in the return conduit.

What is claimed is:

1. In a fuel system for feeding fuel to a diesel engine and including a fuel storage tank, a fuel feed line including a feed pump leading from said storage tank to an injection pump connected to at least one atomizer, a return line for returning non-injected fuel to the fuel supply, a pressure control valve connected to said injection pump for reducing the pressure in said return line, and a flow measuring means in said fuel feed line for measuring consumption of fuel from said storage tank; the improvement comprising:
   means connected to said return line for equalizing the temperature of the fuel therein with the temperature of the fuel in said feed line; and
   means connected to said feed line for creating an over pressure condition in the fuel therein.

2. The improvement claimed in claim 1, wherein said temperature equalizing means comprises a cooler.

3. The improvement claimed in claim 2, wherein said cooler is a heat exchanger positioned in said storage tank.

4. The improvement claimed in claim 1, wherein over pressure creating means comprises a further feed pump in said feed line, the capacity of said further feed pump being greater than the maximum fuel consumption; and an excess flow valve in said return line and connected to said feed line.

* * * * *